July 4, 1961   A. B. GAYLORD   2,990,598
CONNECTOR FOR PLATES
Filed July 24, 1957

INVENTOR:
ARTHUR B. GAYLORD
BY: Teller & McCormick
ATTORNEYS

United States Patent Office 2,990,598
Patented July 4, 1961

2,990,598
CONNECTOR FOR PLATES
Arthur B. Gaylord, Springfield, Mass., assignor to The Kaman Aircraft Corporation, Bloomfield, Conn., a corporation of Connecticut
Filed July 24, 1957, Ser. No. 673,933
8 Claims. (Cl. 24—221)

The general object of the invention is to provide a device for detachably connecting two adjacent parallel plates, ordinarily metal plates, which device is simple and inexpensive and easily installed. In accordance with the general objective, the device comprises two connector members engageable respectively with the plates to be connected, one of said members having an extensible or stretchable elastic portion or stem which extends through an opening in the other member and cooperates therewith to provide tension tending to hold the plates in connected relationship.

Further objects of the invention are to provide a connector device of the type stated having various features of structure and arrangement that make it possible to fully attain said general objective.

The drawing shows three embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Figure 1:
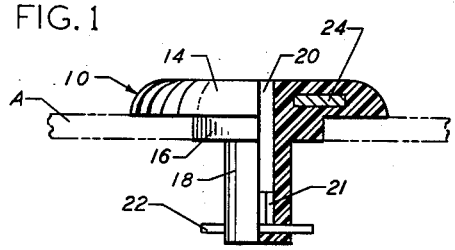
FIG. 1 is a combined side and central vertical sectional view of one connector member of a connecting device embodying the invention.

Referring to the drawings, more particularly FIGS. 1 to 5 thereof, 10 and 12 are two connector members adapted for connecting engagement with each other and adapted for engagement respectively with two closely adjacent first and second parallel plates A and B which are to be fastened together or connected. For convenience, said members 10 and 12 are sometimes hereinafter referred to respectively as the first or insert connector member and as the second or socket connector member. It will be understood that the members 10 and 12 may be made in a variety of sizes and styles according to the weight and thickness of the plates to be fastened together or connected.

The insert member 10 and the socket member 12 are shown with their axes in vertical positions with the member 10 above the member 12 for connecting horizontal upper and lower plates A and B and they will be so described. However, the invention is not in any way limited as to any particular positions of the connector members and plates.

The first or insert connector member 10 is shown as comprising three main portions all integral with each other, these portions being a head 14, a projecting cylindrical portion or boss 16 smaller than the head and below it and adapted to fit or approximately fit a hole in the corresponding plate A, and a relatively long downwardly projecting cylindrical stem 18 concentric with the portion or boss 16 and considerably smaller. The head 14 and the stem 18 are essential and the portion 16 is highly desirable. The head 14 has a lower or downwardly exposed face for engaging the upper face of the corresponding plate A at an area surrounding the hole in said plate and said head may be round and concentric with the portions 16 and 18, but the shape of the head is not important. The thickness of the cylindrical portion or boss 16, when provided, is preferably aproximately equal to the thickness of the plate A. A central vertical hole 20 extends through the member 10 from the top thereof to a location near the bottom or projecting end of the stem 18. The hole 20 may be cylindrical, but for reasons hereinafter stated it may be advantageous to make said hole noncircular in horizontal section, at least near the bottom thereof. As shown, the hole has a hex shape at 21. Near the bottom or projecting end of the stem 18 and extending through the stem is a transverse pin receiving hole adapted for receiving a horizontal pin 22. Said pin has a length greater than the diameter of the stem and it therefore projects at both ends beyond the stem. The length of the pin is at least slightly less than the diameter of the holes in the plates. As shown in FIG. 1, the pin 22 is permanently located in said hole, but this is not always essential as will hereinafter appear. Preferably the pin 22 intersects the hole 20 near the bottom thereof and is exposed within said hole. The pin is formed from metal or other suitable rigid material.

In order that the stem 18 of the first or insert member 10 may be stretched and possibly twisted, as hereinafter more fully explained, said member is formed, preferably by molding, from a suitable flexible elastic plastic material, such as neoprene, or polyvinyl chloride. The invention is not limited to any particular material, but the material should be capable of considerable stretching and twisting without any permanent set, so that it always tends to return to its original size and shape. The material should be electrically nonconductive and it should be highly resistant to abrasion and highly resistant to chemical deterioration as the result of contact with oil or gas.

A suitable tool T is provided which is adapted to enter the hole 20 in the stem 18 for the application of endwise or longitudinal pressure to stretch the stem to a length substantially greater than its initial length. When the pin 22 is permanently in place, the insert member 10 is provided with means thereon accessible at the top and engageable with a tool so that the pin 22 may be turned to a substantial extent about the axis of the stem 18. Preferably the last said means is engageable with the same tool T that is used to downwardly stretch the stem 18, and as shown said means is within the hole 20 and near the bottom thereof. As specifically illustrated, the hole 20 has the before-mentioned hex shape 21 near its bottom and the tool T has a similar hex shape. Furthermore, as before stated, the pin 22 preferably intersects the hole 20. When the pin is so located, the tool T is grooved to receive the exposed portion of the pin 22.

As has been stated, the stem 18 of the member 10 must be resilient and subject to stretching or other deformation, but considerable rigidity is desirable in the head 14. When the material of the member 10 does not of itself provide sufficient head rigidity, a rigid metallic or other washer 24 may be molded in place in said head. The washer 24 is not always necessary and it may be omitted when not required.

The second or socket connector member 12 may be formed from plastic material and it is so shown. However, the member might be formed from solid metal or sheet metal. The member 12, as shown, comprises a head 26 which may be similar to the head 14 of the member 10 but is ordinarily considerably thicker. The head of the member 12 has an upper or upwardly exposed face for engaging the lower face of the corresponding plate B at an area surrounding the hole in said plate and it has an opposite lower or outer face. Said member 12 preferably also comprises a projecting portion or boss 28 smaller than the head and above it and adapted to fit or approximately fit a hole in the said plate B. When the hole is circular, said projecting portion 28 is cylindrical. The thickness of the projecting portion or boss 28 is preferably approximately equal to the thickness of the plate. When the two members 10 and 12 are assembled on plates such as A and B, the two projecting portions or bosses 16 and 28 preferably engage each other as shown.

A central vertical hole 30 extends entirely through the socket member 12, this hole having a diameter at least as large as, and preferably slightly larger than, the initial diameter of the stem 18 of the insert member 10 so that upon assembly the stem 18 can be freely entered in the hole. When the pin 22 is permanently entered in the hole in the stem 18, opposite vertical slots 32, 32 are formed in the member 12, which slots extend radially from the hole 30 and are of such width and depth as to provide clearance for the projecting portions of the pin 22 when the stem 18 of the insert member 10 is inserted in the hole 30 in the member 12. The head 26 of the socket member 12 is preferably formed at the bottom or outer face with aligned opposite grooves 34, 34, the centers of which are in an axial plane at a substantial angle to the plane of the centers of the slots 32, 32. The angle between said planes is preferably 90°. The grooves 34, 34 are of such size and length as to be adapted to receive the projecting portions of the pin 22 as hereinafter explained.

When a plastic material is used for the second member 12, such material may be the same as that for the first member 10, but preferably a much harder and less flexible material is used, such as nylon or Teflon.

Figure 2:
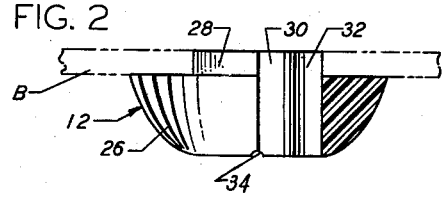
FIG. 2 is a combined side and central vertical sectional view of the other connector member of the connecting device.

When two plates such as A and B are to be releasably fastened together or connected, the connector members 10 and 12 are put in place at the holes in the plates as shown in FIGS. 1 and 2. Prior to their complete engagement, the members are held in place in any suitable manner. Said members may be so held manually, but the socket member 12 is preferably held by bonding or cementing or by a mechanical means such as hereinafter described.

Figure 4:
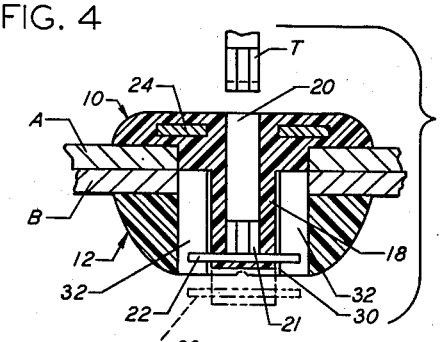
FIG. 4 is a central vertical sectional view showing the said connector members in initially assembled relationship with two plates that are to be connected, this view also showing a portion of a tool used to effect final assembly.

When the connector members have been engaged with the plates, the plates are engaged or aproximately engaged with each other as shown in FIG. 4, the holes in the plates being in register and the stem 18 on the insert member 10 being entered in the hole 30 in the socket member 12. The projecting ends of the pin 22 enter the slots 32, 32 in the socket member.

By means of the tool T pressure is applied to the pin 22 and to the bottom of the stem 18 so that the stem is stretched downwardly approximately to the extent shown by dotted lines in FIG. 4, the pin 22 being thus moved downwardly beyond the aperture 30 and out of the slots 32, 32. With the stem 18 retained in its stretched condition, the tool T is turned through a substantial angle, preferably 90°, so as to correspondingly turn the pin 22. When the socket member has grooves such as 34, 34, the pin 22 is turned sufficiently to bring it out of register with the slots 32, 32 and into register with said grooves 34, 34. Turning is effected as the result of the before-stated engagement of the hex portion of the tool with the hex portion 21 of the hole 20 and also by the before-stated engagement of the grooved portion of the tool with the exposed portion of the pin. After the pin has been turned as stated, the pressure applied by the tool T is released and the stem 18 tends to return to its original length, the end portions of the pin 22 being pressed against the lower portion or face of the socket member 12, preferably at the grooves 34, 34. The tension in the stem 18 transmitted through the pin 22 serves to hold the plates A and B in fixed relationship.

When the tool T has nonrotative engagement with the insert member 10 only near the bottom of the hole 20 in the stem 18, the entire insert member 10 may not turn in unison with the pin. Due to friction at the head 14 said head may not turn at all and the turning of the pin results in twisting of the stem 18. Sometimes there will be a partial turning of the head 14 and a partial twisting of the stem 18. When the head does not immediately turn to the full extent, it may gradually turn during subsequent use as the result of vibration and the like.

It will be obvious that the connector members may be readily detached from each other by again inserting the tool T to again stretch the stem 18 and to then turn the pin 22 until it registers with the slots 32, 32.

Figure 6:
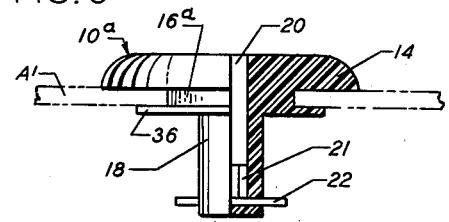
FIG. 6 is a combined side and central vertical sectional view of one connector member of an alternative connecting device embodying the invention.
Figure 7:
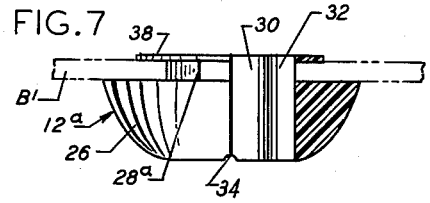
FIG. 7 is a combined side and central vertical sectional view of the other connector member of said alternative connecting device.
Figure 3:
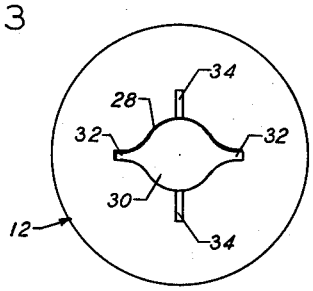
FIG. 3 is a bottom view of the member shown in FIG. 2.
Figure 8:
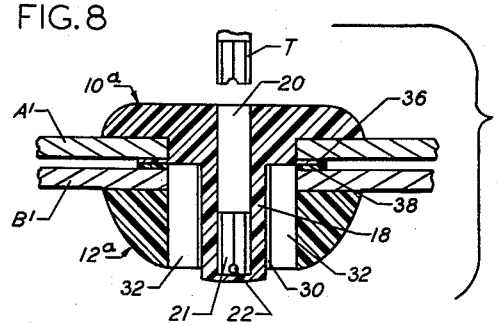
FIG. 8 is a view similar to FIG. 5, but showing said alternative connecting device in finally assembled relationship with two plates.

FIGS. 6, 7 and 8 show an alternative fastener or connector embodying the invention. An alternative second or socket connector member is provided which is or may be identical in construction with the member 12, except as follows. The projecting portion 28ª of the connector member 12ª carries an integral flexible grommet or flange 38 adapted to engage the inner or upper face of plate B' which is one of the plates to be connected. Preferably an alternative first or insert member 10ª is also provided which is or may be identical in construction with the member 12 except as follows. The projecting portion 16ª of the insert member 10ª carries an integral flexible grommet or flange 36 adapted to engage the inner or lower face of the other plate A'. As shown, the plates A' and B' are thinner than the plates A and B, but this is not essential. Each of the flanges 36 and 38 can be folded to permit insertion through the holes in the corresponding plate A' or B', and after insertion the flange is unfolded to retain the corresponding member on the plate. The hole in the plate A' for the member 10ª is circular as said member must be free to turn. The member 12ª should not be free to turn as it might then turn in unison with the member 10ª. For this reason, the hole in the plate B' is noncircular and the projecting portion or boss 28ª is correspondingly noncircular, so that the member 12ª cannot turn. As shown, the portion or boss 28ª is hexagonal and the hole in the plate B' is similarly hexagonal. As shown, the washer 24 is omitted from the head 14 of the member 10ª.

Figure 5:
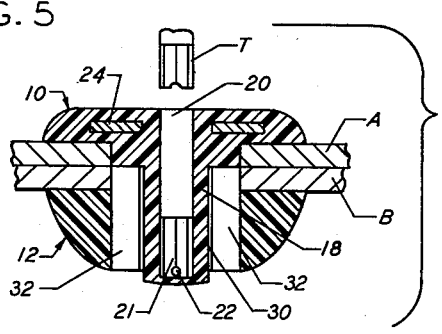
FIG. 5 is a view similar to FIG. 4, but showing the two connector members and plates in their final assembled relationship.

The manner of use of the alternative fastener or connector is the same as that already described in connection with FIGS. 4 and 5. The fastener and the plates in their final assembled positions are shown in FIG. 8.

Figure 9:
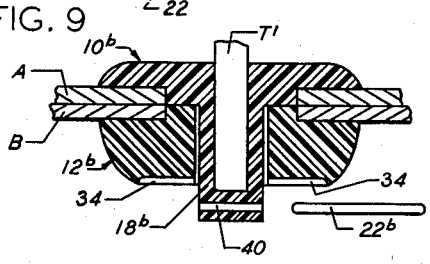
FIG. 9 is a view somewhat similar to FIG. 4, but showing another alternative connecting device with the parts in an intermediate stage of assembly.

FIG. 9 shows another alternative fastener or connector. The last said alternative connector includes a first or insert connector member 10ᵇ which may be similar in construction with the member 10 and a second or socket connector member 12ᵇ which is or may be somewhat similar to the member 12.

As shown, the member 10ᵇ differs from the member 10 chiefly in that the stem 18ᵇ does not initially have a pin such as 22 therein. In lieu of the pin there is a transverse hole 40 adapted to receive an initially separate pin 22ᵇ.

As shown, the member 12ᵇ differs from the member 12 chiefly in that there are no slots such as 32, 32 therein.

In the use of the connector shown in FIG. 9, the parts are initially assembled as previously described. A tool T' is provided, which may be similar to the tool T, but it does not require any slot or any hex shape. After initial assembly the tool T' is inserted in the hole in the stem 18<sup>b</sup> of the member 10<sup>b</sup> and pressure is applied to stretch said stem to approximately the position shown. Then the pin 22<sup>b</sup> is manually inserted in the hole 40 and pressure on the tool T' is released. The stem 18<sup>b</sup> tends to return to its original length and the end portions of the pin are pressed into the grooves 34, 34. The tension in the stem 18<sup>b</sup> transmitted through the pin 22<sup>b</sup> serves to hold the plates A and B in fixed relationship. It will be observed that attaching is effected without any turning of the tool and of the stem such as is necessary with the previously described embodiments of the invention. However, it is necessary to have access to the outer sides of both plates and this is not always convenient.

From the foegoing description it will be apparent that a connecting device embodying the invention is of the two-piece pick-disconnect type. While it is not so limited, it is well adapted for aircraft use, particularly for floor or inspection panels, fairings, cowlings, and the like.

The connecting device can be very quickly and easily installed to effect connection between two plates, and it can be equally quickly and easily released to disconnect the two plates. Only one hole is required in each plate to be connected and these holes if desired may be very near the edges of the plates.

When made from suitable materials, the device is light in weight and it can be dustproof and liquidproof. With properly selected materials it can be highly resistant to abrasion and chemical deterioration. When both of the connector members are made from electrically non-conducting plastic materials, the possibility of electrolysis is eliminated.

The invention claimed is:

1. In a device for connecting closely adjacent upper and lower parallel plates having registering holes therein, the combination of an insert member formed at least in part of an elastic plastic material and including a head having a downwardly exposed face engageable with the upper face of the upper plate at an area surrounding the hole therein and having a stem perpendicular to said face and adapted to project downwardly through the hole in the lower plate which stem has a diameter substantially smaller than that of the holes in the plates and which stem has a transverse pin extending through it near its lower end and having a length greater than the stem diameter and slightly less than the diameter of said plate holes and which stem has a vertical central hole for receiving a vertical tool by means of which said stem may be stretched downwardly to a length substantially greater than its initial length, said insert member also having means thereon accessible at the top and engageable with a tool so that said pin may be turned about the vertical axis of the stem, and a socket member having an upwardly exposed face engageable with the lower face of the lower plate at an area surrounding the hole therein and having an opposite lower face which socket member is provided with a vertical aperture extending entirely therethrough and also with two vertical opposite slots extending entirely therethrough which aperture has a diameter at least as large as the initial diameter of the stem of the insert member and which slots provide clearance for the projecting portions of said pin on said stem so that said stem and said pin upon downward movement of said insert member may be freely moved through said aperture and said slots, the thickness of said socket member being such that said stem must be stretched in order to position said pin below said socket member aperture and below said slots so that after stretching of the stem said pin may be turned as aforesaid to bring it out of register with said slots and so that upon release of downward tool pressure the projecting portions of the pin engage the lower face of the socket member to apply upward pressure thereto.

2. The combination as set forth in claim 1, wherein a metallic washer is embedded in the head of the insert member, said washer being concentric with the axis of said stem and of the hole in said stem.

3. A connecting device as set forth in claim 1, wherein the tool engageable means that enables said pin to be turned is engageable with the same tool by means of which said stem may be stretched.

4. A connecting device as set forth in claim 3, wherein the tool engageable means is within said hole in the stem and near the bottom thereof so that the turning of the tool may effect turning of the pin with at least a partial twisting of the stem of the insert member relatively to the head thereof.

5. A connecting device as set forth in claim 1, wherein said outer face of the socket member includes radial grooves having their centers in an axial plane at a substantial angle to an axial plane through the centers of said slots.

6. A connecting device as set forth in claim 1, wherein said socket member also has a thin integral flange adapted to be folded and inserted through the hole in the lower plate and adapted to be unfolded after insertion so as to retain said socket member in place.

7. A connecting device as set forth in claim 1, wherein said insert member is provided with a thin integral flange adapted to be folded and inserted through the hole in the upper plate and adapted to be unfolded after insertion so as to retain said insert member in place.

8. A connecting device as set forth in claim 1, wherein said socket member has a noncircular projection adapted to enter and fit a noncircular hole in said second plate so as to prevent rotation of said socket member.

References Cited in the file of this patent

UNITED STATES PATENTS

| | | |
|---|---|---|
| 1,895,826 | Trudeau | Jan. 31, 1933 |
| 2,036,875 | Kraft | Apr. 7, 1936 |
| 2,095,931 | Kraft | Oct. 12, 1937 |
| 2,209,403 | Kittner et al. | July 30, 1940 |
| 2,230,879 | Bronson | Feb. 4, 1941 |
| 2,419,071 | Hall | Apr. 15, 1947 |
| 2,678,585 | Ellis | May 18, 1954 |
| 2,709,290 | Rosenthal | May 31, 1955 |
| 2,971,366 | Geisler | May 7, 1957 |

FOREIGN PATENTS

| | | |
|---|---|---|
| 360,591 | France | Mar. 2, 1906 |